(12) United States Patent
Kamiya

(10) Patent No.: US 11,895,408 B2
(45) Date of Patent: *Feb. 6, 2024

(54) IMAGE PICKUP SYSTEM, IMAGE PICKUP METHOD, AND COMPUTER READABLE STORAGE MEDIUM FOR GENERATING VIDEO SIGNALS HAVING FIRST AND SECOND DYNAMIC RANGES

(71) Applicant: SONY GROUP CORPORATION, Tokyo (JP)

(72) Inventor: Koji Kamiya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,042

(22) Filed: Nov. 23, 2021

(65) Prior Publication Data

US 2022/0086363 A1 Mar. 17, 2022

Related U.S. Application Data

(63) Continuation of application No. 16/066,883, filed as application No. PCT/JP2016/005218 on Dec. 22, 2016, now Pat. No. 11,212,461.

(30) Foreign Application Priority Data

Jan. 5, 2016 (JP) ................. 2016-000729

(51) Int. Cl.
*H04N 23/76* (2023.01)
*H04N 5/20* (2006.01)
(Continued)

(52) U.S. Cl.
CPC ............. *H04N 23/76* (2023.01); *G06T 5/009* (2013.01); *G06T 5/50* (2013.01); *H04N 1/407* (2013.01);
(Continued)

(58) Field of Classification Search
CPC .......... H04N 5/243; H04N 1/407; H04N 5/20; H04N 5/232939; H04N 5/2355;
(Continued)

(56) References Cited

U.S. PATENT DOCUMENTS 8,606,009 B2    12/2013  Sun
8,811,490 B2*   8/2014   Su ........................ H04N 19/147
                                                          382/167

(Continued)

FOREIGN PATENT DOCUMENTS

GB       2534929 A      10/2016
JP       11-220659 A    8/1999
(Continued)

OTHER PUBLICATIONS

International Search Report dated Mar. 7, 2017 in PCT/JP2016/005218, (2 pages).

(Continued)

*Primary Examiner* — Luong T Nguyen
(74) *Attorney, Agent, or Firm* — Oblon, McClelland, Maier & Neustadt, L.L.P.

(57) ABSTRACT

This image pickup system includes an image pickup unit that captures a subject to obtain a pixel signal, and a processing circuit that generates a first video signal having a first dynamic range from the pixel signal generated by the image pickup unit, and generates a second video signal having a second dynamic range correlated with the first dynamic range.

23 Claims, 10 Drawing Sheets

(51) Int. Cl.
*H04N 1/407* (2006.01)
*H04N 23/63* (2023.01)
*H04N 23/741* (2023.01)
*G06T 5/00* (2006.01)
*G06T 5/50* (2006.01)

(52) U.S. Cl.
CPC ............. *H04N 5/20* (2013.01); *H04N 23/633* (2023.01); *H04N 23/741* (2023.01); *G06T 2207/20208* (2013.01)

(58) Field of Classification Search
CPC .... H04N 5/23293; H04N 5/235; H04N 23/76; H04N 23/633; H04N 23/741; H04N 23/63; H04N 23/70; G06T 5/009; G06T 5/50; G06T 2207/20208
See application file for complete search history.

(56) References Cited

U.S. PATENT DOCUMENTS

| | | | |
|---|---|---|---|
| 8,860,874 B2 | 10/2014 | Nishiguichi et al. | |
| 9,984,446 B2 | 5/2018 | Ha et al. | |
| 10,855,930 B2* | 12/2020 | Kamiya | H04N 5/2355 |
| 11,212,461 B2* | 12/2021 | Kamiya | H04N 5/232939 |
| 2004/0218830 A1 | 11/2004 | Kang et al. | |
| 2005/0104900 A1 | 5/2005 | Toyama et al. | |
| 2008/0095408 A1* | 4/2008 | Yokohata | H04N 5/23264 |
| | | | 348/222.1 |
| 2010/0111489 A1* | 5/2010 | Presler | H04N 25/745 |
| | | | 348/222.1 |
| 2010/0157078 A1* | 6/2010 | Atanassov | G06T 5/50 |
| | | | 348/222.1 |
| 2014/0225941 A1* | 8/2014 | Van der Vleuten | H04N 7/00 |
| | | | 345/690 |
| 2015/0243200 A1 | 8/2015 | Pan | |
| 2017/0070681 A1 | 3/2017 | Nattress | |

FOREIGN PATENT DOCUMENTS

| | | | |
|---|---|---|---|
| JP | 2003-230022 A | | 8/2003 |
| JP | 2008-193714 A | | 8/2008 |
| JP | 2013-33202 | * | 2/2013 |
| JP | 2013-90095 A | | 5/2013 |
| JP | 2015-37222 A | | 2/2015 |
| JP | 2017-60113 A | | 3/2017 |
| WO | WO2012/133551 A1 | | 10/2012 |
| WO | WO2013/112532 A2 | | 8/2013 |
| WO | WO2015/198560 A1 | | 12/2015 |

OTHER PUBLICATIONS

Extended European Search Report dated Jul. 29, 2019 in corresponding European Patent Application No. 16883545.2, (9 pages).
Office Action dated Aug. 14, 2019 in corresponding Japanese Patent Application No. 2017-205915 (with English Translation), (12 pages).
Office Action dated Feb. 12, 2020 in corresponding Japanese Patent Application No. 2017-205915 (with English Translation) (10 pages).
Combined Chinese Office Action and Search Report dated Mar. 19, 2020 in corresponding Chinese Patent Application No. 201680076713.3 (with English Translation) (18 pages).
Japanese Office Action Issued in Application JP2017-205915 dated Jun. 5, 2020, with English Translation, (7 pages).

* cited by examiner

IMAGE PICKUP SYSTEM, IMAGE PICKUP METHOD, AND COMPUTER READABLE STORAGE MEDIUM FOR GENERATING VIDEO SIGNALS HAVING FIRST AND SECOND DYNAMIC RANGES

CROSS REFERENCE TO RELATED APPLICATIONS

This application is a continuation of U.S. Ser. No. 16/066,883, filed on Jun. 28, 2018, the entire contents of which is incorporated herein by reference which is incorporated by reference. U.S. Ser. No. 16/066,883 is a National Stage of PCT/JP2016/005218, filed on Dec. 22, 2016, and claims the benefit of priority under 35 U.S.C. § 119 of Japanese Application No. 2016-000729, filed Jan. 5, 2016.

TECHNICAL FIELD

The present technology relates to an image pickup system, an image pickup method, and a program with which two types of videos having different dynamic ranges can be generated from pixel signals obtained by image pickup by an image pickup device.

BACKGROUND ART

In HDR (High Dynamic Range) imaging, it is possible to express videos having a wide dynamic range and realize high-luminance expressions and expressions of colors having high luminance, that have been unable to be fully expressed by SDR (Standard Dynamic Range) video signals having a standard dynamic range displayable on a normal monitor.

Patent Literature 1 discloses a method of encoding an HDR video and an LDR video together.

CITATION LIST

Patent Literature

Patent Literature 1: Japanese Patent Application Laid-open No. 2015-506623

DISCLOSURE OF INVENTION

Technical Problem

The present technology aims at solving various problems in a case of simultaneously generating a plurality of videos having different dynamic ranges, such as an HDR video and an SDR video, from pixel signals obtained by image pickup by an image pickup unit.

Solution to Problem

For solving the problem described above, an image pickup system according to an embodiment of the present technology includes a processing circuit that generates a first video signal having a first dynamic range from a pixel signal generated by an image pickup unit that captures a subject to obtain a pixel signal, and generates a second video signal having a second dynamic range correlated with the first dynamic range.

In this image pickup system, an HDR video and an SDR video can be generated simultaneously by the processing circuit from the pixel signal obtained by the image pickup unit. Further, in this image pickup system, since the processing circuit generates, from the pixel signal, the second video signal having the second dynamic range correlated with the first dynamic range of the first video signal, it is possible to perform, in a case where brightness in appearance of the first video signal is changed by an iris adjustment, an equivalent change on the brightness in appearance of the second video signal created simultaneous with the first video signal.

The processing circuit may be configured to set, on a basis of information for setting the correlation between the first dynamic range and the second dynamic range, the second dynamic range while using the first dynamic range as a reference.

The processing circuit may be configured to set a ratio between a first gain for the pixel signal used for generating the first video signal and a second gain for the pixel signal used for generating the second video signal, on a basis of the information for setting the correlation.

The processing circuit may be configured to generate the first video signal having the first dynamic range from a signal obtained by carrying out gamma signal processing on the pixel signal.

The first video signal may be an SDR (Standard Dynamic Range) video, and the second video signal may be an HDR (High Dynamic Range) video.

The image pickup system according to the present technology may further include a display that displays the first video signal generated by the processing circuit.

The display may be a viewfinder.

The processing circuit may carry out processing of displaying the correlation between the first dynamic range and the second dynamic range on the display on a basis of the information for setting the correlation.

In the image pickup system according to the present technology, while the first video signal is displayed on the display, iris adjustment processing is carried out on a basis of an iris adjustment input.

An image pickup method according to another aspect of the present technology includes:
capturing, by an image pickup unit, a subject to generate a pixel signal; and
generating, by a processing circuit, a first video signal having a first dynamic range from the pixel signal generated by the image pickup unit, and generating a second video signal having a second dynamic range correlated with the first dynamic range.

A program according to another aspect of the present technology is a program that causes a computer to operate as a processing circuit that generates a first video signal having a first dynamic range from a pixel signal generated by an image pickup unit that captures a subject to obtain a pixel signal, and generates a second video signal having a second dynamic range correlated with the first dynamic range.

An image pickup apparatus according to further another aspect of the present technology includes:
an image pickup unit that captures a subject to obtain a pixel signal; and
a processing circuit that generates a first video signal having a first dynamic range from the pixel signal generated by the image pickup unit, and generates a second video signal having a second dynamic range correlated with the first dynamic range.

Advantageous Effects of Invention

As described above, according to the present technology, it is possible to solve various problems in a case of simultaneously generating a plurality of videos having different dynamic ranges, such as an HDR video and an SDR video, from pixel signals obtained by image pickup by an image pickup unit.

MODES FOR CARRYING OUT THE INVENTION

Hereinafter, embodiments of the present technology will be described.

First Embodiment

[Hardware Configuration of Image Pickup System]

Figure 1:
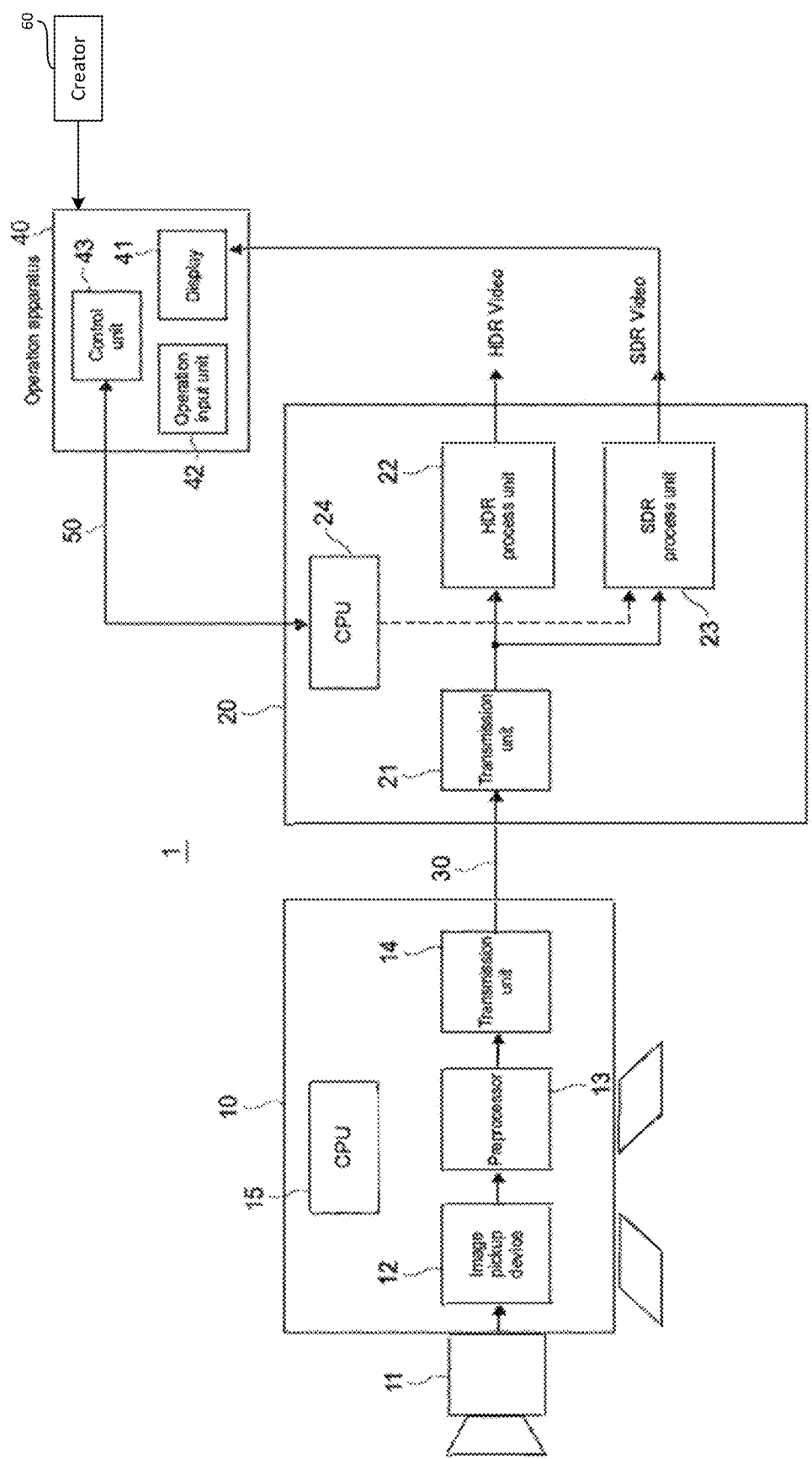
FIG. 1 A block diagram showing an overall hardware configuration of an image pickup system 1 according to a first embodiment of the present technology.

FIG. 1 is a block diagram showing an overall hardware configuration of an image pickup system according to a first embodiment of the present technology.

As shown in the figure, this image pickup system 1 includes an image pickup apparatus 10 and a camera control unit 20. The image pickup apparatus 10 and the camera control unit 20 are connected via a camera cable 13 such as an optical fiber.

The image pickup apparatus 10 includes an optical system 11 including a lens group for image pickup, an image pickup device 12, a preprocessor 13, a transmission unit 14, and a CPU 15.

The image pickup device 12 is an image sensor such as a CMOS (Complementary Metal-Oxide-Semiconductor) device and a CCD (Charge-Coupled Device), and converts light taken in via the optical system (not shown) into an electric pixel signal corresponding to a light intensity.

It should be noted that in the configuration of the image pickup system 1 according to the present technology, an "image pickup unit" corresponds to the image pickup apparatus 10 described above.

The preprocessor 13 carries out signal correction processing such as defect correction on pixel signals obtained by the image pickup device 12 and lens aberration correction.

The transmission unit 14 carries out processing of transmitting the pixel signals output from the preprocessor 13 to the camera control unit 20 via the camera cable 13. Specifically, the pixel signals transmitted to the camera control unit 20 by the transmission unit 14 are RAW image signals that have not been subjected to processing related to a gain or dynamic range, debayer processing, gamma signal processing, and the like.

Meanwhile, the camera control unit 20 includes a transmission unit 21, an HDR process unit 22, an SDR process unit 23, and a CPU 24.

The transmission unit 21 receives pixel signals transmitted from the image pickup apparatus 10 via the camera cable 13 and supplies the pixel signals to the HDR process unit 22 and the SDR process unit 23.

The HDR process unit 22 carries out processing of generating an HDR video from the pixel signals supplied from the transmission unit 21.

The SDR process unit 23 carries out processing of generating an SDR video from the pixel signals supplied from the transmission unit 21.

The HDR process unit 22 and the SDR process unit 23 are constituted of one or a plurality of integrated circuits and the like, and correspond to a processing circuit in the configuration of the present technology.

The CPU 24 is a controller that controls respective parts of the camera control unit 20. The CPU 24 is capable of communicating with an operation apparatus 40 connected via a communication channel 50 such as a LAN (Local Area Network). The operation apparatus 40 includes a display 41, an operation input unit 42, and a control unit 43. The operation apparatus 40 may be constituted of, for example, an information processing apparatus such as a personal computer, a dedicated control panel for camera control, or the like. The operation input unit 42 may be constituted of, for example, operation keys, a mouse, a trackball, a dial, a lever, a touch sensor panel, a remote controller, or the like. The control unit 43 of the operation apparatus 40 is constituted of a circuit such as a CPU, receives various control commands and setting information from a creator such as a VE (Video Engineer), and communicates with the CPU 24 of the camera control unit 20 via the communication channel 50.

Next, configurations of the HDR process unit 22 and SDR process unit 23 of the camera control unit 20 will be described.

[Configurations of HDR Process Unit 22 and SDR Process Unit 23]

Figure 2:
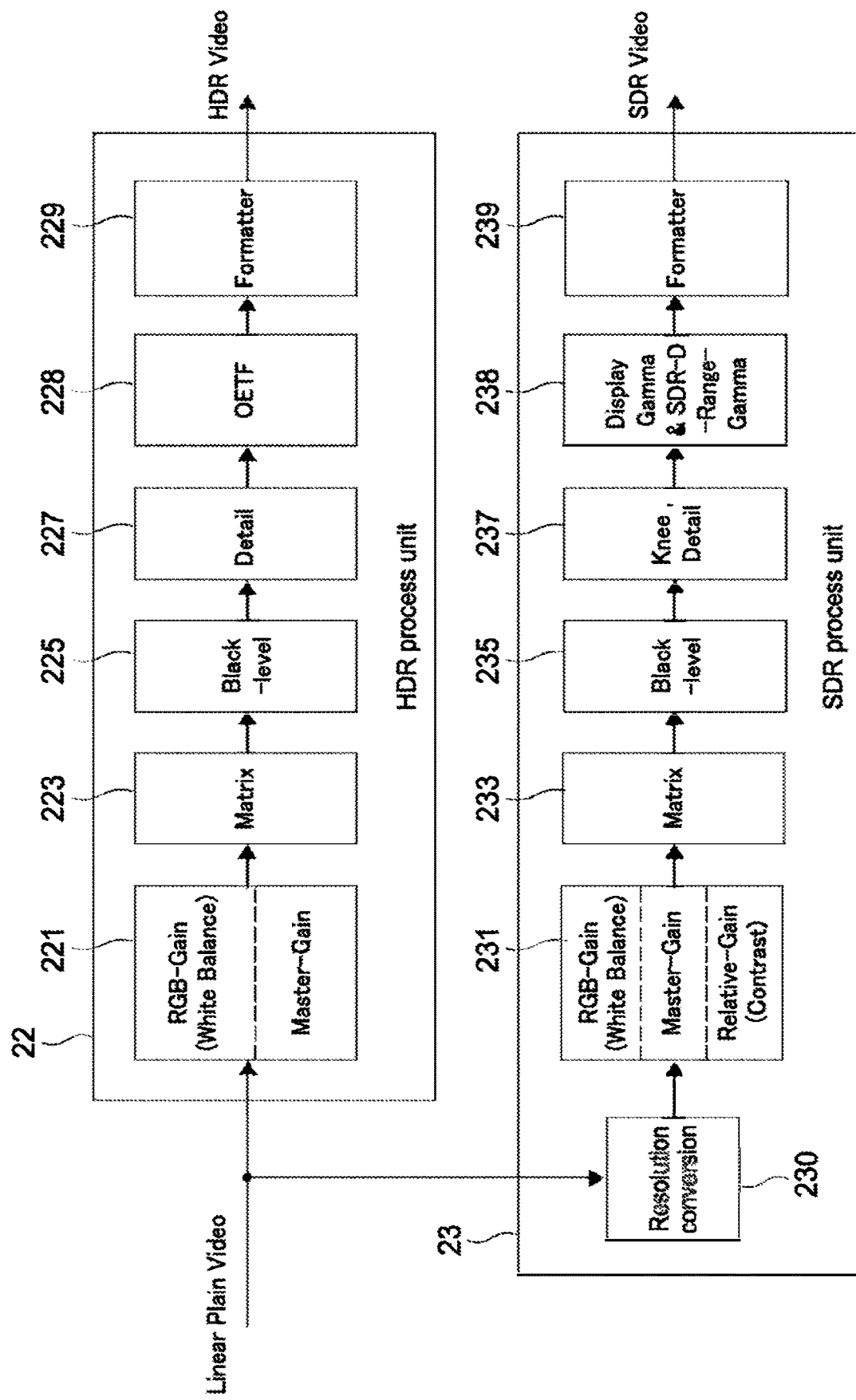
FIG. 2 A block diagram showing functional configurations of an HDR process unit 22 and an SDR process unit 23 in the image pickup system 1 shown in FIG. 1.

FIG. 2 is a block diagram showing functional configurations of the HDR process unit 22 and SDR process unit 23.

The HDR process unit 22 includes an HDR gain adjustment unit 221, a matrix processing unit 223, a black level correction unit 225, a detail processing unit 227, an OETF unit 228, and a formatter 229.

In addition to control of a master gain, the HDR gain adjustment unit 221 controls an RGB gain for a white balance adjustment.

The matrix processing unit 223 carries out debayer processing, linear matrix processing, and the like on the pixel signals that have passed through the HDR gain adjustment unit 221, and obtains color image data.

The black level correction unit 225 carries out black level correction of the color image data.

The detail processing unit 227 carries out detail processing of the color image data.

The OETF unit 228 carries out gamma signal processing by performing gradation compression by OETF (Optical-Electro Transfer Function) for HDR, on the color image data.

The formatter 229 converts the color image data that has passed through the OETF unit 228 into an HDR video transmission format.

Next, the configuration of the SDR process unit 23 will be described.

The SDR process unit 23 includes a resolution conversion unit 230, an SDR gain adjustment unit 231, a matrix processing unit 233, a black level correction unit 235, a knee/detail processing unit 237, a gamma processing unit 238, and a formatter 239.

The resolution conversion unit 230 converts a resolution of pixel signals transmitted from the image pickup apparatus 10 (e.g., 4K resolution) into a resolution of HD or the like.

The SDR gain adjustment unit 231 controls a master gain based on a relative gain and also controls an RGB gain for a white balance adjustment. Here, the relative gain is information for setting a correlation between a dynamic range of an SDR video (first dynamic range) and a dynamic range of an HDR video (second dynamic range). On the basis of this relative gain, the SDR gain adjustment unit 231 adjusts a ratio of a master gain of the SDR gain adjustment unit 231 to a master gain of the HDR gain adjustment unit 221. The relative gain is set with respect to the SDR gain adjustment unit 231 by the CPU 24.

The matrix processing unit 233 carries out debayer processing, linear matrix processing, and the like on the pixel signals that have passed through the SDR gain adjustment unit 231, to obtain color image data.

The black level correction unit 235 carries out black level correction of the color image data.

The knee/detail processing unit 237 carries out knee (KNEE) correction and detail processing on the color image data.

The gamma processing unit 238 carries out gamma processing and gamma processing for display, with respect to the SDR dynamic range set by the SDR gain adjustment unit 231.

The formatter 239 converts the color image data into an SDR video transmission format.

Problems to be Solved by Image Pickup System 1 of this Embodiment

In HDR videos, due to a wide dynamic range, it is difficult for breakage of a video due to over range to occur, and even if a luminance reference for shooting is changed, the video appears quite well as a video expression. However, on the contrary, the video becomes too brighter than a level intended by the creator, or an expression of brightness tends to vary for each scene.

In a typical HDR video creation field, pixel signals obtained by an image pickup apparatus are recorded as linearly as possible with a wide dynamic range, and minor video signal adjustments are performed so as to be suited for viewing in post-production, to thus obtain an HDR video having brightness intended by the creator. However, in HDR live broadcasting in sports broadcasting and the like, for example, an HDR video needs be created in real time. In this regard, some kind of a luminance reference is required for HDR shooting, but no such reference exists yet.

Further, while HDR imaging is expected to become a mainstream in a future video shooting field, a state where HDR videos and SDR videos coexist is expected to continue for some time in the future. Therefore, there is a need for an image pickup system suitable for the state where HDR videos and SDR videos coexist. The image pickup system of this embodiment can solve at least the respective problems described above.

It should be noted that a luminance dynamic range of an HDR video is wider than a luminance dynamic range of an SDR video. For example, assuming that the luminance dynamic range of the SDR video is 0 to 100%, the luminance dynamic range of the HDR video is, for example, 100% to 1300%, 100% to 10000%, or the like. An output luminance range of the image pickup apparatus 10 is 0 to 600% or the like.

In the image pickup system 1 of this embodiment, it is possible to simultaneously generate, by the HDR process unit 22 and the SDR process unit 23 provided in the camera control unit 20, an HDR video and an SDR video from pixel signals transmitted from the image pickup apparatus 10. Specifically, pixel signals transmitted from the image pickup apparatus 10 to the camera control unit 20 via the camera cable 30 are respectively supplied to the HDR process unit 22 and the SDR process unit 23 provided in the camera control unit 20. As a result, an HDR video is generated in the HDR process unit 22, and an SDR video is generated in the SDR process unit 23.

Further, the SDR gain adjustment unit 231 of the camera control unit 20 includes a function of varying a ratio of a master gain on the SDR process side to a master gain on the HDR process side, on the basis of a relative range given from the CPU 24. The relative range is information for setting a correlation between the dynamic range of an SDR video and the dynamic range of an HDR video. For example, the relative range is information that defines how many times the dynamic range of the SDR video the dynamic range of the HDR video is to be set to. By this relative range, the ratio of the master gain on the SDR process side to the master gain on the HDR process side can be set to an arbitrary ratio such as 1 and ½, for example.

If the ratio of the master gain on the SDR process side to the master gain on the HDR process side is set in this way, the dynamic range of the HDR video correlated with the dynamic range of the SDR video can be obtained.

More specifically, an upper limit reference of the dynamic range of the SDR video is given by reference white (Diffuse-White) selected by the creator. In the image pickup system 1 according to this embodiment, by selecting this reference white (Diffuse-White) of the SDR video, an upper limit reference of the dynamic range of the HDR video (reference white (Diffuse-White) of HDR video) is also determined on the basis of the correlation based on the relative range.

The relative range should be selected as appropriate in accordance with a shooting environment such as daytime, nighttime, indoor, outdoor, inside a studio, fine weather, and rainy weather. Therefore, a plurality of types of relative ranges associated with various shooting environments are prepared. As a method of preparing a plurality of types of relative ranges associated with the shooting environments, there is a method of comparing, by human eyes, brightness of appearance of the SDR video and HDR video simultaneously output from the camera control unit 20. It is only necessary to change the value of the relative range and compare the SDR video and the HDR video every time the value is changed, and determine a relative range in which the brightness in appearance of the SDR video is close to that of the HDR video as a relative range optimum for the shooting environment.

If the relative range optimum for the shooting environment is set, when the brightness of the SDR video is changed by an iris adjustment, the change of the brightness intended by the creator of the HDR video can be reflected on the appearance of the HDR video.

Next, a relative range setting example will be described.

[1:1 Setting]

Figure 3:
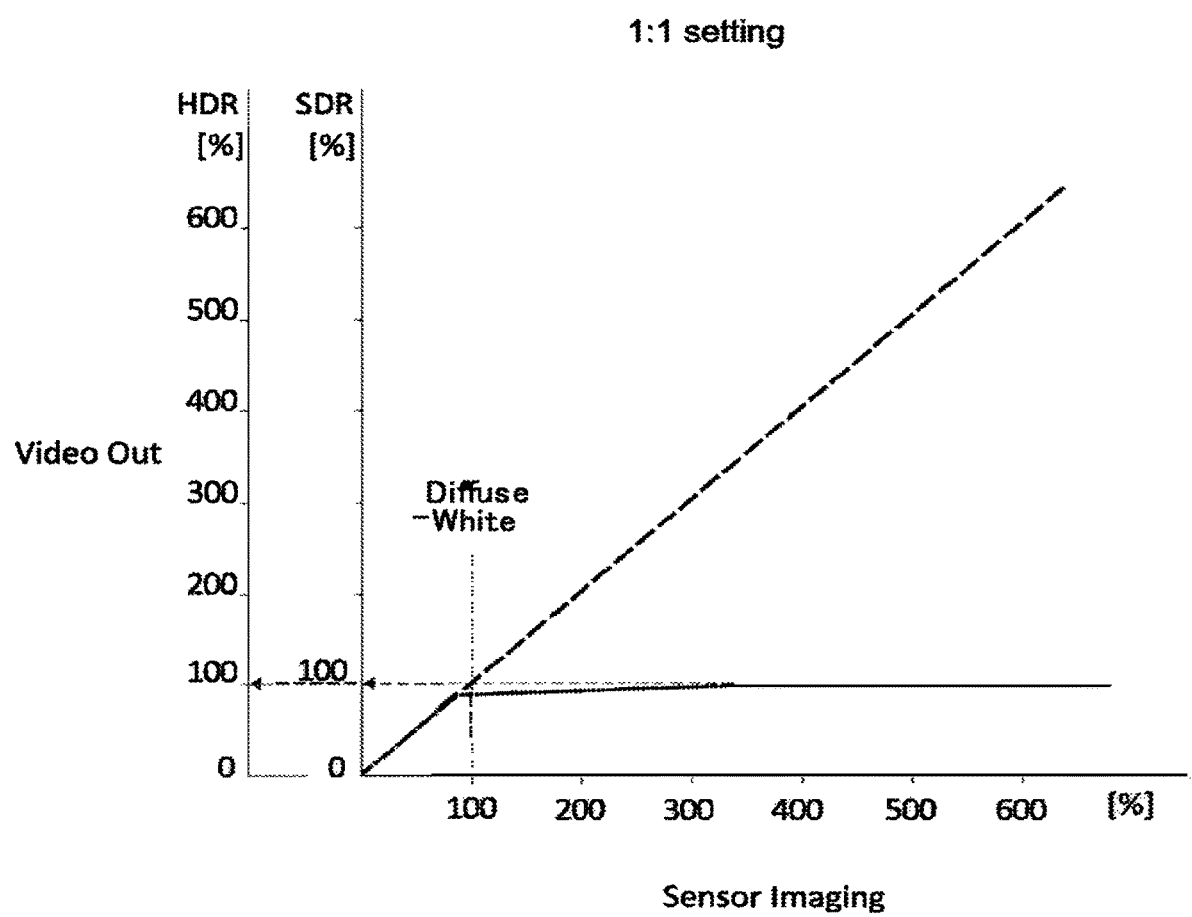
FIG. 3 A diagram showing a relationship between dynamic ranges of an SDR video and an HDR video in a 1:1 setting.

FIG. 3 is a diagram showing a relationship between the dynamic ranges of the SDR video and the HDR video when set at 1:1.

It should be noted that in the following figures including the current figure that are used as the relative range setting example, a relationship before applying an OETF gamma on the HDR video side and a display gamma on the SDR video side is shown to help understand the relationship between the dynamic range of the SDR video and that of the HDR video.

A case of transmitting 4K-resolution pixel signals (Linear Plane Video) from the image pickup apparatus 10 to the camera control unit 20 is assumed. A dynamic range of an image pickup device is, for example, 1300% assuming that the dynamic range of the SDR video is 100%.

In the 1:1 setting, the dynamic range of the HDR video and the dynamic range of the SDR video become the same. In other words, the dynamic range of HDR video is adjusted to the dynamic range of the SDR video.

It should be noted that in the SDR video, high-luminance components exceeding the dynamic range of the SDR video in the pixel signals are squeezed into a few-% high-luminance part in the dynamic range of the SDR video by a knee function and a clip function.

[HDR-Contrast Double Setting]

Figure 4:
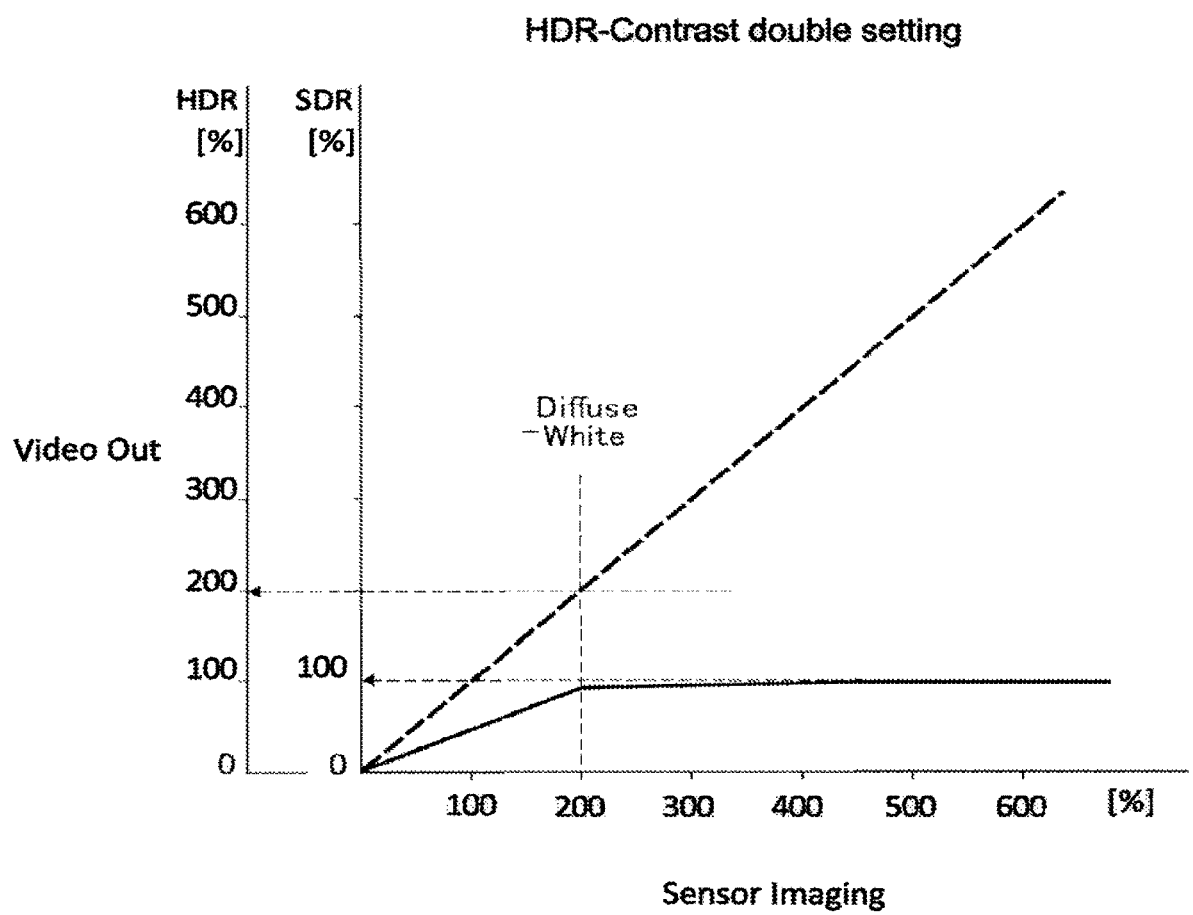
FIG. 4 A diagram showing a relationship between the dynamic ranges of an SDR video and an HDR video in an HDR-contrast double setting.

FIG. 4 is a diagram showing a relationship between the dynamic ranges of an SDR video and an HDR video when HDR-contrast is doubled.

In this setting, the master gain of the SDR gain adjustment unit 231 is set to be ½ the master gain of the HDR gain adjustment unit 221 by the relative range. As a result, the dynamic range of the HDR video becomes twice the dynamic range of the SDR video, and the contrast of the HDR video is doubled with respect to the SDR video.

[SDR-D-Range-Gamma 350% Setting]

In this image pickup system 1, the SDR process unit 23 is also capable of generating an SDR video from signals obtained by applying gamma on pixel signals. In this case, since a dynamic range of the pixel signals is partially compressed to the SDR dynamic range, the reference white (Diffuse-White) as an upper limit of the dynamic range of the HDR video can be set to become higher.

Figure 5:
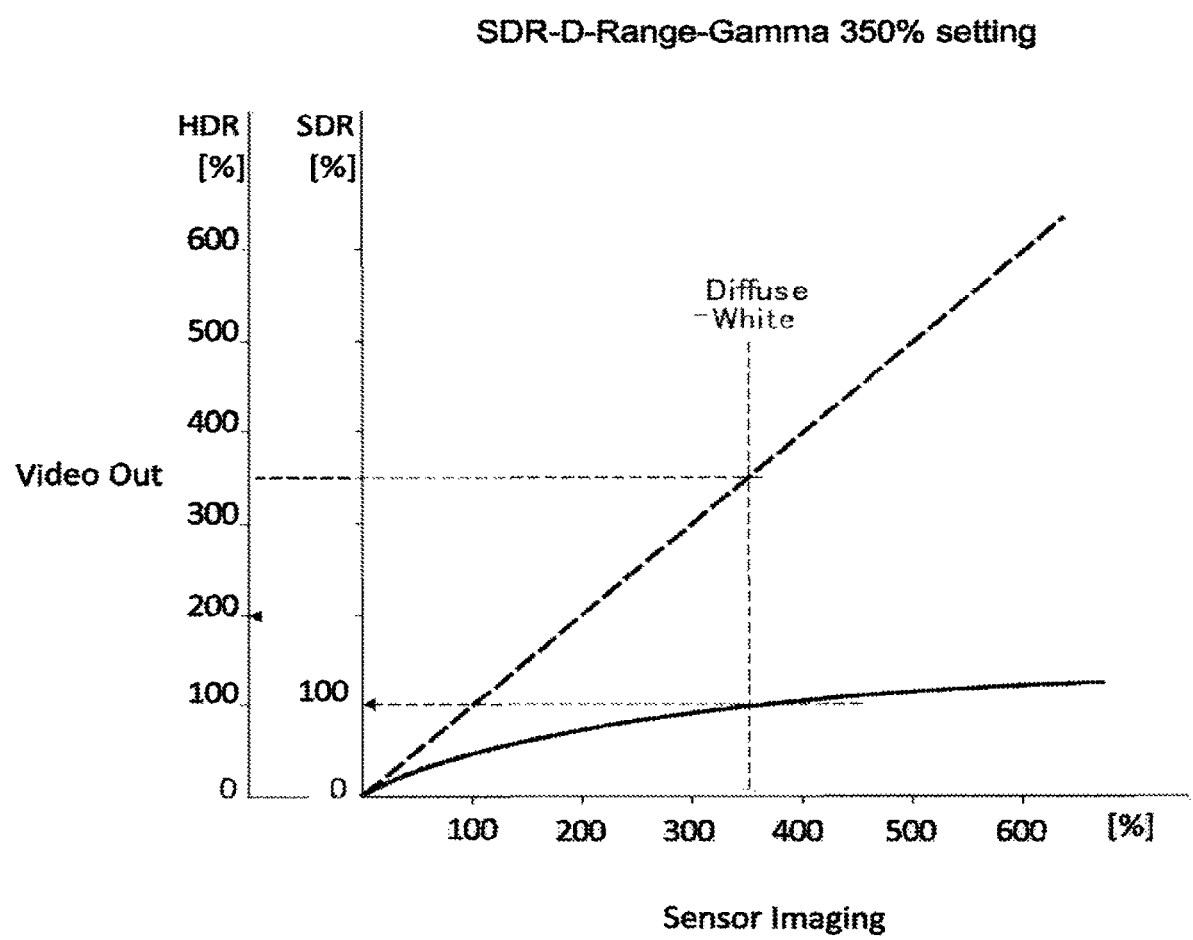
FIG. 5 A diagram showing a relationship between the dynamic ranges of an SDR video and an HDR video in an SDR-D-Range-Gamma 350% setting.

FIG. 5 is a diagram showing, as an example thereof, a relationship between the dynamic ranges of the SDR video and the HDR video in an SDR-D-Range-Gamma 350% setting.

By applying gamma to the pixel signals input to the SDR process unit 23, a part up to 350% of the dynamic range of the pixel signals is compressed to the SDR dynamic range. As a result, the HDR dynamic range is set to be 350% the SDR dynamic range.

[HDR Contrast Double & SDR-D-Range-Gamma 220% Setting]

Figure 6:
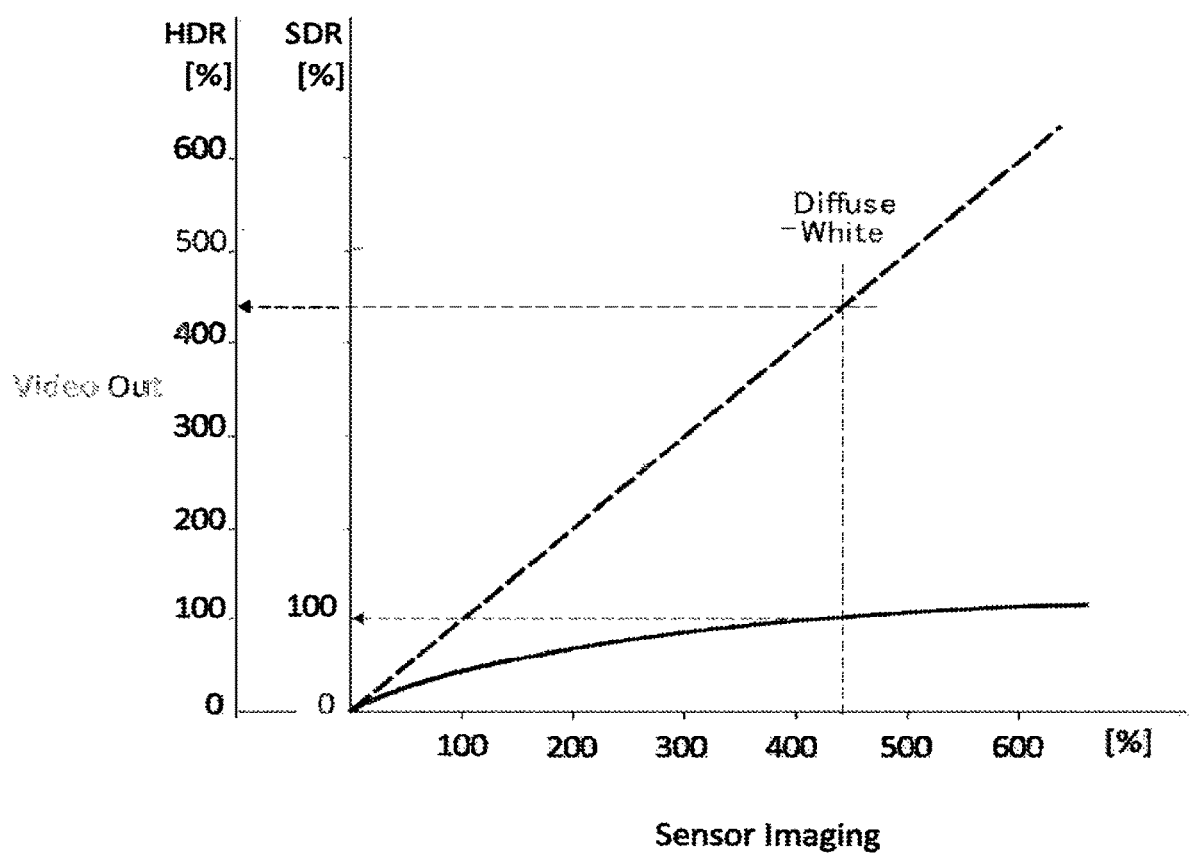
FIG. 6 A diagram showing a relationship between the dynamic ranges of an SDR video and an HDR video in an HDR contrast double & SDR-D-Range-Gamma 220% setting.

FIG. 6 is a diagram showing a relationship between the dynamic ranges of the SDR video and the HDR video in an HDR contrast double & SDR-D-Range-Gamma 220% setting.

In this way, by combining HDR contrast double and SDR-D-range-Gamma 220%, the HDR dynamic range is set to become 440% the SDR dynamic range.

[Regarding Method of Setting Relative Range]

The camera control unit 20 is connected to the operation apparatus 40 of the creator 60 via the communication channel 50 such as a LAN (Local Area Network), for example. The operation apparatus 40 includes the display 41, the operation input unit 42, and the control unit 43. The control unit 43 is capable of causing the display 41 to display a relative range selection GUI. The creator 60 can select an arbitrary relative range using the GUI displayed on the display 41 by selecting it by an operation input of the operation input unit 42. The control unit 43 of the operation apparatus 40 receives information of the relative range selected by the creator 60 using the operation input unit 42 and transmits relative range setting information to the CPU 24 of the camera control unit 20 via the communication channel 50. The CPU 24 of the camera control unit 20 sets the relative range in the SDR gain adjustment unit 231 of the SDR process unit 23 on the basis of this relative range setting information.

Further, an SDR video generated by the camera control unit 20 is displayed on the display 41 of the operation apparatus 40. The creator can check the expressions of brightness and colors of the SDR video on the display 41. At this time, the control unit 43 of the operation apparatus 40 causes the correlation between the dynamic range of the SDR video (or upper limit reference thereof) and the dynamic range of the HDR video (or upper limit reference thereof) to be displayed on the display 41 in a form of, for example, "SDR:HDR=100%:200%", on the basis of the set relative range. Accordingly, the creator can check the relationship between the expressions of brightness and colors of the SDR video and the relative range.

Alternatively, the correlation between the dynamic range of the SDR video (or upper limit reference thereof) and the dynamic range of the HDR video (or upper limit reference thereof) may be displayed in a form of a graph as shown in FIGS. 3 to 6.

[Regarding Iris Adjustment]

In this image pickup system 1, an operation input for an iris adjustment can be performed using the GUI displayed on the display 41. The control unit 43 of the operation apparatus 40 transmits control information for the iris adjustment to the CPU 24 of the camera control unit 20 via the communication channel 50 on the basis of the operation input for the iris adjustment received by the operation input unit 42. The CPU 24 of the camera control unit 20 is capable of mutually communicating with the CPU 15 of the image pickup apparatus 10 via the camera cable 30. Upon receiving the control information for the iris adjustment from the operation apparatus 40, the CPU 24 of the camera control unit 20 notifies the CPU 15 of the image pickup apparatus 10 of this control information via the camera cable 30. The CPU 15 of the image pickup apparatus 10 controls an iris of the optical system 11 in accordance with this control information.

As described above, in the image pickup system 1 of this embodiment, the HDR video and the SDR video can be simultaneously generated by the HDR process unit 22 and SDR process unit 23 in the camera control unit 20 from pixel signals obtained by the image pickup apparatus 10.

In addition, in the image pickup system 1 of this embodiment, when the brightness in appearance of the SDR video is changed by the iris adjustment, an equivalent change can be made to the brightness in appearance of the HDR video created simultaneous with the SDR video. Accordingly, even in a case of creating an HDR video in real time, for example, an HDR video having brightness suited for viewing can be created.

Modified Example 1

Figure 7:
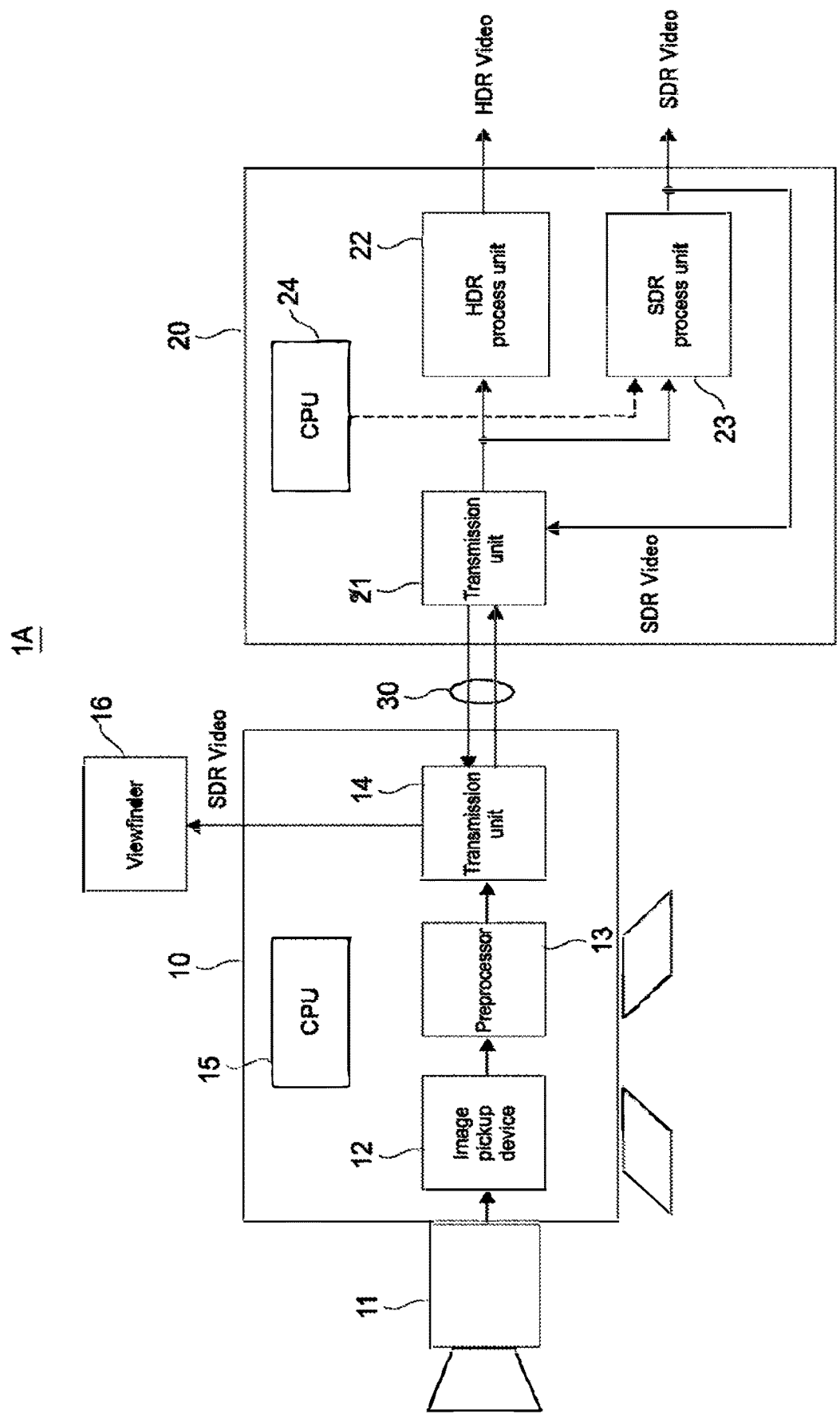
FIG. 7 A block diagram showing Modified Example 1 of the image pickup system according to the present technology.

FIG. 7 is a block diagram showing Modified Example 1 of the image pickup system according to the present technology.

This image pickup system 1A is configured to cause a viewfinder 16 of the image pickup apparatus 10 to display an SDR video generated by the camera control unit 20.

The SDR video generated by the SDR process unit 23 of the camera control unit 20 is transmitted to the image pickup apparatus 10 by the transmission unit 21 via the camera cable 30. The transmission unit 14 of the image pickup apparatus 10 outputs the SDR video transmitted from the camera control unit 20 to the viewfinder 16. By performing an iris adjustment of appropriate brightness on the SDR video, a video having appropriate brightness can be displayed on the viewfinder 16, and shooting can be performed while viewing a video no different from before.

Modified Example 2

Figure 8:
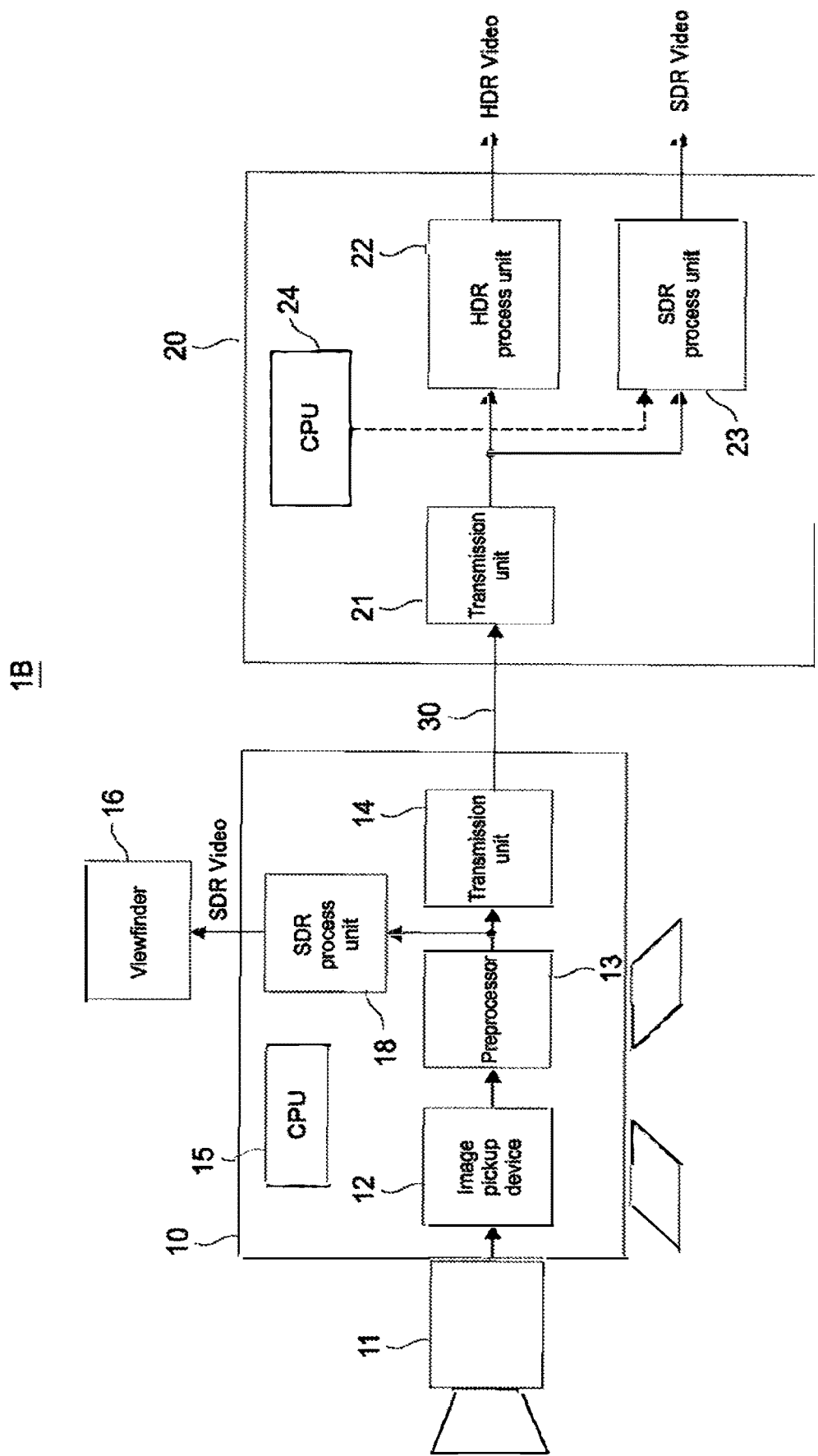
FIG. 8 A block diagram showing Modified Example 2 of the image pickup system according to the present technology.

FIG. 8 is a block diagram showing Modified Example 2 of the image pickup system according to the present technology.

In this image pickup system 1B, the image pickup apparatus 10 includes, in addition to the viewfinder 16 described above, an SDR process unit 18 having a configuration similar to that of the SDR process unit 23 of the camera control unit 20.

In this image pickup system 1B, an SDR video is generated by the SDR process unit 18 of the image pickup apparatus 10, and this SDR video is output to the viewfinder 16 to be displayed. Therefore, a person shooting can view the SDR video without the SDR video being transmitted from the camera control unit 20.

In this image pickup system 1B, the CPU 24 of the camera control unit 20 and the CPU 15 of the image pickup apparatus 10 communicate with each other via the camera cable 30, to set respective parameter values including the relative gain set in the respective units of the SDR process unit 23 of the camera control unit 20 also in the respective units of the SDR process unit 18 of the image pickup apparatus 10. Therefore, it is possible to display the SDR video which is no different in appearance from that of Modified Example 1 on the viewfinder 16.

Modified Example 3

Figure 9:
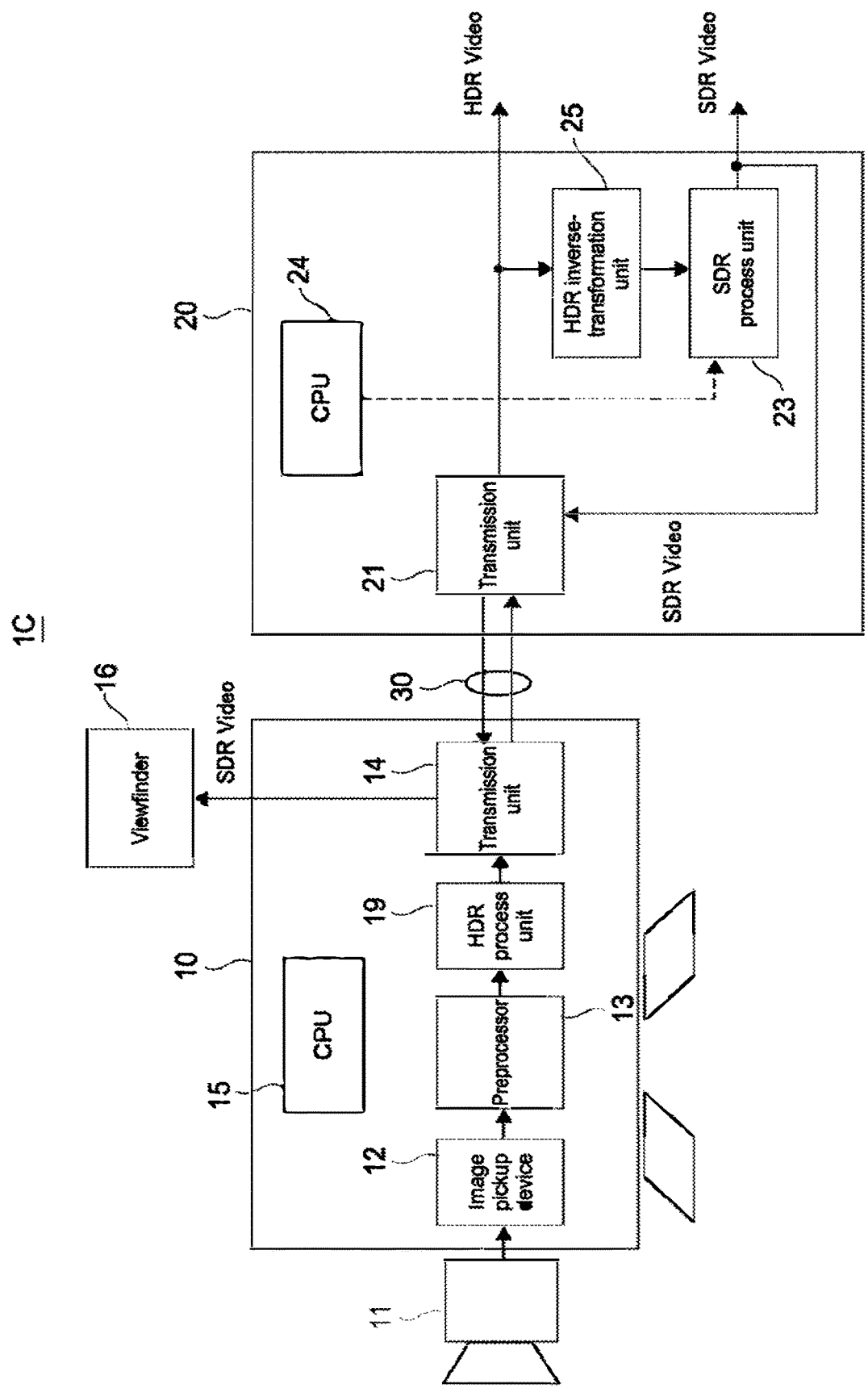
FIG. 9 A block diagram showing Modified Example 3 of the image pickup system according to the present technology.

FIG. 9 is a block diagram showing Modified Example 3 of the image pickup system according to the present technology.

This image pickup system 1C includes an HDR process unit 19 in the image pickup apparatus 10. An HDR video generated by the HDR process unit 19 of the image pickup apparatus 10 is transmitted to the camera control unit 20 and output as it is as an HDR video of the main-line system.

Further, the HDR video transmitted to the camera control unit 20 is also supplied to an HDR inverse-transformation unit 25 provided in the camera control unit 20. The HDR inverse transformation unit 25 inversely transforms the HDR video into original pixel signals and outputs the pixel signals to the SDR process unit 23 of the camera control unit 20. An SDR video generated by the SDR process unit 23 is supplied to the main-line system, and is transmitted back to the image pickup apparatus 10 via the transmission unit 21 and output to the viewfinder 16 of the image pickup apparatus 10 to be displayed.

Modified Example 4

Figure 10:
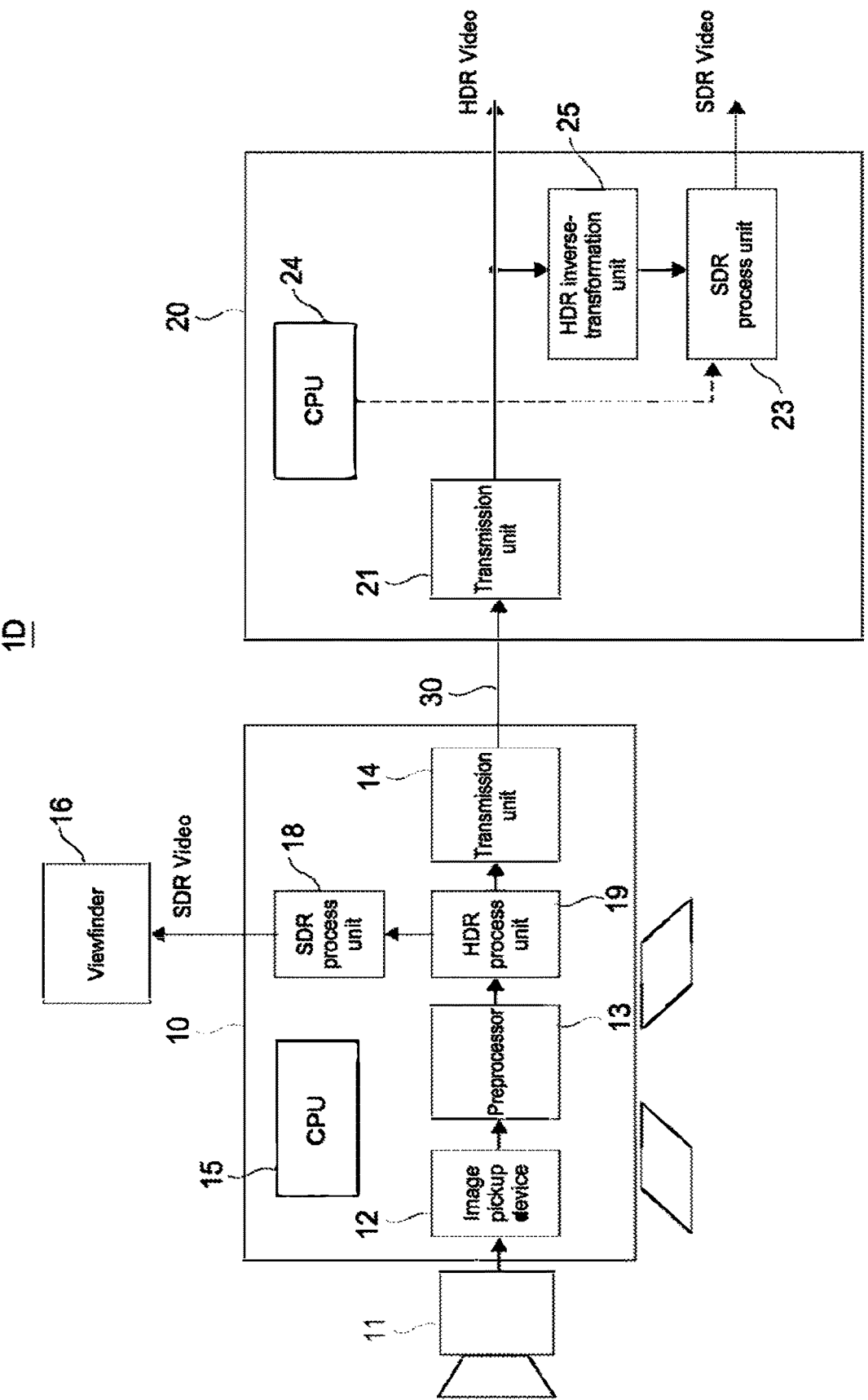
FIG. 10 A block diagram showing Modified Example 4 of the image pickup system according to the present technology.

FIG. 10 is a block diagram showing Modified Example 4 of the image pickup system according to the present technology.

This image pickup system 1D is configured by adding the SDR process unit 18 to the image pickup apparatus 10 of the image pickup system 1C according to Modified Example 3 above. In other words, the SDR process unit 18 in the image pickup apparatus 10 generates and displays it on the viewfinder 16. Therefore, a system for receiving an SDR video from the camera control unit 20 is unnecessary in the image pickup apparatus 10.

Modified Example 5

Although the case where the present technology is applied to the image pickup system constituted of the image pickup apparatus 10 and the camera control unit 20 has been described above, the present technology can also be configured as a single image pickup apparatus by incorporating the configurations of the HDR process unit 22 and SDR process unit 23 of the camera control unit 20 in the image pickup apparatus 10 shown in FIG. 1. In this case, the image pickup device 11 in the image pickup apparatus 10 corresponds to the "image pickup unit" in the configuration of the image pickup apparatus according to the present technology.

Modified Example 6

Furthermore, it is also possible to configure the camera control unit 20 using a computer. Specifically, by installing a program for causing the computer to operate as the camera control unit 20 in the computer and connecting it with the image pickup apparatus 10, an image pickup system equivalent to that of the first embodiment can be realized.

Modified Example 7

In the modified examples described above, the CPU 24 of the camera control unit 20 or the CPU 15 of the image pickup apparatus 10 may display the correlation between the dynamic range of the SDR video and the dynamic range of the HDR video on the viewfinder 16 in a form of, for example, "SDR:HDR=100%:200%", on the basis of the relative range.

It should be noted that the present technology can also take the following configurations.
 (1) An image pickup system, including
  a processing circuit that generates a first video signal having a first dynamic range from a pixel signal generated by an image pickup unit that captures a subject to obtain a pixel signal, and generates a second video signal having a second dynamic range correlated with the first dynamic range.

(2) The image pickup system according to (1), in which
the processing circuit is configured to set, on a basis of information for setting the correlation between the first dynamic range and the second dynamic range, the second dynamic range while using the first dynamic range as a reference.

(3) The image pickup system according to (1) or (2), in which
the processing circuit is configured to set a ratio between a first gain for the pixel signal used for generating the first video signal and a second gain for the pixel signal used for generating the second video signal, on a basis of the information for setting the correlation.

(4) The image pickup system according to any one of (1) to (3), in which
the processing circuit is configured to generate the first video signal having the first dynamic range from a signal obtained by carrying out gamma signal processing on the pixel signal.

(5) The image pickup system according to any one of (1) to (4), in which
the first video signal is an SDR (Standard Dynamic Range) video, and
the second video signal is an HDR (High Dynamic Range) video.

(6) The image pickup system according to any one of (1) to (5), further including
a display that displays the first video signal generated by the processing circuit.

(7) The image pickup system according to (6), in which
the display is a viewfinder.

(8) The image pickup system according to (6) or (7), in which
the processing circuit carries out processing of displaying the correlation between the first dynamic range and the second dynamic range on the display on a basis of the information for setting the correlation.

(9) The image pickup system according to any one of (1) to (8), in which
while the first video signal is displayed on the display, iris adjustment processing is carried out on a basis of an iris adjustment input.

(10) An image pickup method, including:
capturing, by an image pickup unit, a subject to generate a pixel signal; and
generating, by a processing circuit, a first video signal having a first dynamic range from the pixel signal generated by the image pickup unit, and generating a second video signal having a second dynamic range correlated with the first dynamic range.

(11) The image pickup method according to (10), in which
the processing circuit sets, on a basis of information for setting the correlation between the first dynamic range and the second dynamic range, the second dynamic range while using the first dynamic range as a reference.

(12) The image pickup method according to (10) or (11), in which
the processing circuit sets a ratio between a first gain for the pixel signal used for generating the first video signal and a second gain for the pixel signal used for generating the second video signal, on a basis of the information for setting the correlation.

(13) The image pickup method according to any one of (10) to (12), in which
the processing circuit generates the first video signal having the first dynamic range from a signal obtained by carrying out gamma signal processing on the pixel signal.

(14) The image pickup method according to any one of (10) to (13), in which
the first video signal is an SDR (Standard Dynamic Range) video, and
the second video signal is an HDR (High Dynamic Range) video.

(15) The image pickup method according to any one of (10) to (14), further including
a display that displays the first video signal generated by the processing circuit.

(16) The image pickup method according to (15), in which
the display is a viewfinder.

(17) The image pickup method according to (15) or (16), in which
the processing circuit carries out processing of displaying the correlation between the first dynamic range and the second dynamic range on the display on a basis of the information for setting the correlation.

(18) The image pickup method according to any one of (10) to (17), in which
the processing circuit carries out iris adjustment processing on a basis of an iris adjustment input while the first video signal is displayed on the display.

(19) A program that causes a computer to operate as
a processing circuit that generates a first video signal having a first dynamic range from a pixel signal generated by an image pickup unit that captures a subject to obtain a pixel signal, and generates a second video signal having a second dynamic range correlated with the first dynamic range.

(20) The program according to (19), in which
the processing circuit sets, on a basis of information for setting the correlation between the first dynamic range and the second dynamic range, the second dynamic range while using the first dynamic range as a reference.

(21) The program according to (19) or (20), in which
the processing circuit sets a ratio between a first gain for the pixel signal used for generating the first video signal and a second gain for the pixel signal used for generating the second video signal, on a basis of the information for setting the correlation.

(22) The program according to any one of (19) to (21), in which
the processing circuit generates the first video signal having the first dynamic range from a signal obtained by carrying out gamma signal processing on the pixel signal.

(23) The program according to any one of (19) to (22), in which
the first video signal is an SDR (Standard Dynamic Range) video, and
the second video signal is an HDR (High Dynamic Range) video.

(24) The program according to any one of (19) to (23), further including
a display that displays the first video signal generated by the processing circuit.

(25) The program according to (24), in which the display is a viewfinder.

(26) The program according to (24) or (25), in which the processing circuit carries out processing of displaying the correlation between the first dynamic range and the second dynamic range on the display on a basis of the information for setting the correlation.

(27) The program according to any one of (19) to (26), in which the processing circuit carries out iris adjustment processing on a basis of an iris adjustment input while the first video signal is displayed on the display.

(28) An image pickup apparatus, including a processing circuit that generates a first video signal having a first dynamic range from a pixel signal generated by an image pickup unit that captures a subject to obtain a pixel signal, and generates a second video signal having a second dynamic range correlated with the first dynamic range.

(29) The image pickup apparatus according to (28), in which the processing circuit is configured to set, on a basis of information for setting the correlation between the first dynamic range and the second dynamic range, the second dynamic range while using the first dynamic range as a reference.

(30) The image pickup apparatus according to (28) or (29), in which the processing circuit is configured to set a ratio between a first gain for the pixel signal used for generating the first video signal and a second gain for the pixel signal used for generating the second video signal, on a basis of the information for setting the correlation.

(31) The image pickup apparatus according to any one of (28) to (30), in which the processing circuit is configured to generate the first video signal having the first dynamic range from a signal obtained by carrying out gamma signal processing on the pixel signal.

(32) The image pickup apparatus according to any one of (28) to (31), in which the first video signal is an SDR (Standard Dynamic Range) video, and the second video signal is an HDR (High Dynamic Range) video.

(33) The image pickup apparatus according to any one of (28) to (32), further including a display that displays the first video signal generated by the processing circuit.

(34) The image pickup apparatus according to (33), in which the display is a viewfinder.

(35) The image pickup apparatus according to (33) or (34), in which the processing circuit carries out processing of displaying the correlation between the first dynamic range and the second dynamic range on the display on a basis of the information for setting the correlation.

(36) The image pickup apparatus according to any one of (26) to (35), in which while the first video signal is displayed on the display, iris adjustment processing is carried out on a basis of an iris adjustment input.

REFERENCE SIGNS LIST 1 image pickup system
10 image pickup apparatus
12 image pickup unit
15 CPU
16 viewfinder
20 camera control unit
22 HDR process unit
23 SDR process unit
24 CPU
40 operation apparatus
41 display
42 operation input unit
221 HDR gain adjustment unit
231 SDR gain adjustment unit

The invention claimed is:

1. An image pickup system, comprising: processing circuitry configured to:
generate correlation information between a first dynamic range and a second dynamic range based on predetermined relation information, the correlation information indicating a correlation between the first dynamic range and the second dynamic range,
generate a first video signal by applying a first detail processing to a first pixel signal, the first video signal having the first dynamic range, and
generate a second video signal by applying a second detail processing to a second pixel signal, the second video signal having the second dynamic range,
wherein a first gain adjustment of the first video signal and a second gain adjustment of the second video signal are set according to the correlation information, and
wherein the first pixel signal is obtained from an image sensor and the second pixel signal is obtained from an inverse transformation of the first video signal, the inverse transformation being performed by inverse transformation circuitry.

2. The image pickup system of claim 1, wherein:
the first video signal has a first resolution,
the second video signal has a second resolution, and
the first resolution is higher than the second resolution.

3. The image pickup system of claim 2, wherein:
the first resolution is 4 K, and
the second resolution is high definition (HD).

4. The image pickup system of claim 3, wherein the second video signal is adjusted based on a range set by a creator.

5. The image pickup system of claim 1, wherein:
the first dynamic range is HDR (High Dynamic Range) and
the second dynamic range is SDR (Standard Dynamic Range).

6. The image pickup system of claim 1, wherein:
the first video signal has a high definition (HD) resolution,
the second video signal has a 4K resolution,
the first dynamic range is SDR (Standard Dynamic Range), and
the second dynamic range is HDR (High Dynamic Range).

7. The image pickup system of claim 1, wherein the second detail processing which is used to generate the second video signal involves applying display gamma.

8. The image pickup system of claim 1, wherein the first detail processing which is used to generate the first video signal involves applying opto-electronic transfer function (OETF) gamma.

9. The image pickup system according to claim 1, further comprising a display, wherein the processing circuitry is configured to display the second video signal on the display.

10. The image pickup system of claim 9, wherein the display is a view finder.

11. The image pickup system of claim 1, wherein the processing circuitry is further configured to perform the first gain adjustment to generate the first video signal and the second gain adjustment to generate the second video signal, the first gain adjustment being set according to the second gain adjustment.

12. The image pickup system of claim 1, wherein a maximum of the first dynamic range is a multiple of a maximum of the second dynamic range, the multiple set according to the correlation information.

13. The image pickup system of claim 1, wherein a maximum of the first dynamic range is set by a reference (Diffuse-White) of the second dynamic range.

14. An image pickup system, comprising:
a display; and
processing circuitry including display processing circuitry, the processing circuitry configured to:
generate correlation information between a first dynamic range and a second dynamic range based on predetermined relation information, the correlation information indicating a correlation between the first dynamic range and the second dynamic range,
generate a first video signal by applying a first detail processing to a first pixel signal, the first video signal having the first dynamic range,
generate a second video signal by applying a second detail processing to a second pixel signal, the second video signal having the second dynamic range,
generate, using the display processing circuitry, a third video signal having a third dynamic range which is smaller than the first dynamic range, and
provide the third video signal to the display,
wherein a first gain adjustment of the first video signal and a second gain adjustment of the second video signal are set according to the correlation information.

15. The image pickup system of claim 14, further comprising:
inverse transformation circuitry, wherein the first pixel signal is obtained from an image sensor and the second pixel signal is obtained from an inverse transformation of the first video signal, the inverse transformation being performed by the inverse transformation circuitry.

16. An image pickup method, comprising:
generating correlation information between a first dynamic range and a second dynamic range based on predetermined relation information, the correlation information indicating a correlation between the first dynamic range and the second dynamic range,
generating a first video signal by applying a first detail processing to a first pixel signal, the first video signal having the first dynamic range;
generating a second pixel signal by applying an inverse transformation to the first video signal; and
generating a second video signal by applying a second detail processing to the second pixel signal, the second video signal having the second dynamic range which is based on the correlation information,
wherein a first gain adjustment of the first video signal and a second gain adjustment of the second video signal are set according to the correlation information.

17. The image pickup method of claim 16, wherein:
the first video signal has a first resolution,
the second video signal has a second resolution, and
the first resolution is higher than the second resolution.

18. The image pickup method of claim 17, wherein:
the first resolution is 4 K, and
the second resolution is high definition (HD).

19. The image pickup method of claim 18, wherein the second video signal is adjusted based on a range set by a creator.

20. The image pickup method of claim 16, wherein:
the first dynamic range is HDR (High Dynamic Range) and
the second dynamic range is SDR (Standard Dynamic Range).

21. The image pickup method of claim 16, wherein:
the first video signal has a high definition (HD) resolution,
the second video signal has a 4 k resolution,
the first dynamic range is SDR (Standard Dynamic Range), and
the second dynamic range is HDR (High Dynamic Range).

22. The image pickup method of claim 16, wherein the second detail processing involves applying display gamma.

23. The image pickup method of claim 16, wherein the first detail processing involves applying opto-electronic transfer function (OETF) gamma.

* * * * *